(12) United States Patent  
Garrec

(10) Patent No.: US 8,915,156 B2  
(45) Date of Patent: Dec. 23, 2014

(54) METHOD FOR FRICTION COMPENSATION IN A DEVICE WITH FORCE FEEDBACK PROVIDED WITH CABLE TRANSMISSION

(75) Inventor: Philippe Garrec, Gif sur Yvette (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 249 days.

(21) Appl. No.: 13/264,873

(22) PCT Filed: May 6, 2010

(86) PCT No.: PCT/EP2010/056188  
§ 371 (c)(1),  
(2), (4) Date: Oct. 17, 2011

(87) PCT Pub. No.: WO2010/128106  
PCT Pub. Date: Nov. 11, 2010

(65) Prior Publication Data  
US 2012/0031164 A1  Feb. 9, 2012

(30) Foreign Application Priority Data

May 6, 2009 (FR) ..................... 09 02181

(51) Int. Cl.  
*B25J 13/02* (2006.01)  
*B25J 9/00* (2006.01)  
*B25J 9/10* (2006.01)

(52) U.S. Cl.  
CPC ............... *B25J 13/02* (2013.01); *B25J 9/1045* (2013.01)  
USPC ....................................... 73/865.9

(58) Field of Classification Search  
CPC ................................. B25J 13/02; B25J 9/1045  
USPC ................................................. 73/159, 865.9  
See application file for complete search history.

(56) References Cited

U.S. PATENT DOCUMENTS

| 4,108,264 A | * | 8/1978 | Tanaka ........................... 180/2.1 |
| 4,537,364 A | * | 8/1985 | Pollman et al. ............. 242/390.9 |
| 2004/0138530 A1 | * | 7/2004 | Kawai et al. ................... 600/152 |

FOREIGN PATENT DOCUMENTS

JP   2001048482 A  *  2/2001  
SU   1383117 A  *  3/1988

OTHER PUBLICATIONS

P. Garrec, et al., Une Nouvelle Technologie D'Orthese Portable, Conference Handicap 2004, Jun. 17, 2004-Jun. 18, 2004, XP002569233.

* cited by examiner

*Primary Examiner* — Hezron E Williams  
*Assistant Examiner* — Nashmiya Fayyaz  
(74) *Attorney, Agent, or Firm* — Sughrue Mion, PLLC

(57) ABSTRACT

A method of compensating friction in a force-feedback device comprising a control member manipulated by a user and coupled to a tensioned cable that is actuated by a motor and gearbox unit. The method includes the steps of (1) detecting a variation in the sag of the cable caused by a manipulation of the control member, and (2) in response to such a detection, controlling the unit so that it develops a force (Fa) that compensates, at least in part, for the internal friction (Rsa) of the unit that opposes movement of the control member manipulated by the user.

5 Claims, 1 Drawing Sheet

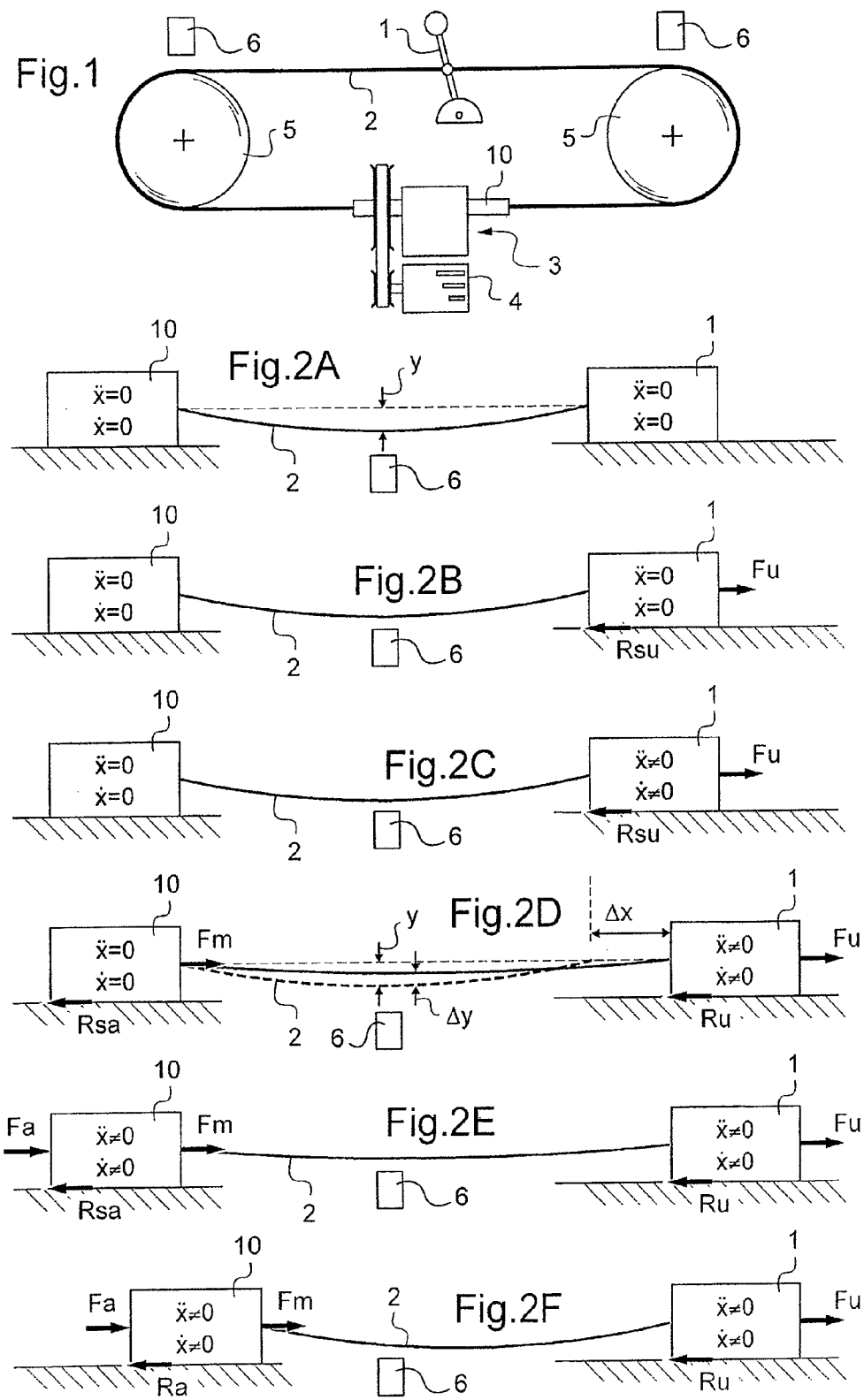

METHOD FOR FRICTION COMPENSATION IN A DEVICE WITH FORCE FEEDBACK PROVIDED WITH CABLE TRANSMISSION

CROSS REFERENCE TO RELATED APPLICATIONS

This application is a National Stage of International Application No. PCT/EP2010/056188 filed on May 6, 2010, which claims priority from French Patent Application No. 09 02181, filed on May 6, 2009, the contents of all of which are incorporated herein by reference in their entirety.

The invention relates to a method of compensating friction in a force-feedback device fitted with a cable transmission.

BACKGROUND OF THE INVENTION

Force-feedback devices are known, in particular in the field of orthoses or of servo manipulators. In various systems in which the user manipulates a control lever in order to impose movements on an arm or any other controlled device, it is advantageous for the user to feel forces in the lever that are representative of the forces acting on the controlled arm. For this purpose, force-feedback devices are used that are coupled to the control lever and that exert thereon a force that is representative of the force to which the controlled arm is subjected.

In the particular field of servo manipulators controlled by a master arm that is manipulated by the user, it is known to fit the master arm with actuators, each including a motor and gearbox unit that acts on a transmission cable.

The drive system constituted by the unit and the transmission suffers from internal friction that is difficult to reduce to below 5% of the maximum static force of the actuator. Such friction, due in particular to internal friction in the motor and gearbox unit, can disturb the sensations of the user, since it introduces discontinuities in the movements of the arm.

It is known to implement compensation of the friction that opposes free maneuvering of the arm by controlling the motor and gearbox unit so that it exerts a force that compensates said friction, at least in part, and in particular compensates the friction internal to the unit. Nevertheless, such compensation is generally implemented only once it has been detected that the cable has actually been set into movement and that the movable portions of the unit that are coupled to the cable have been moved, which assumes that the user has already exerted a force that is sufficient to overcome at least the internal friction of the unit.

OBJECT OF THE INVENTION

An object of the invention is to propose a method of compensating friction in a cable force-feedback device, at least in part, the method serving to reduce the threshold effects that can be felt by the user.

BRIEF DESCRIPTION OF THE INVENTION

To this end, there is provided a method of compensating friction in a force-return device comprising a control member manipulated by a user and coupled to a tensioned cable that is actuated by a motor and gearbox unit, which method comprises the steps of:

detecting a variation in the sag of the cable caused by a manipulation of the control member; and in response to such a detection, controlling the unit so that it develops a force that compensates, at least in part, the internal friction of the unit that opposes movement of the control member manipulated by the user.

It is recalled here that the cable naturally presents sag that results from the weight of the cable, and if the cable is mounted as a loop on pulleys, then it also presents bending reaction moments that result from the tension needed to wind the cable around the pulleys. Insofar as the tension in the cable is generally high compared with its weight, the effect of the bending moments predominates and gives rise to transverse movements of the cable that occur particularly in the plane of the pulleys and that lead to the cable sagging.

At the very beginning of manipulation, when the control member manipulated by the user begins to move, thereby taking with it the portion of the cable that is coupled to the control member, the movable portions of the motor and gearbox unit that are coupled to the cable have still not had the time to be set into movement by being driven by the cable. Nevertheless, the portion of cable that extends between the control member and the unit (or between the control member and an adjacent pulley around which the cable is wound) is subjected to lengthening or shortening, and that leads to a variation in its sag.

A detection of this variation in sag is used by the invention as a signal for controlling the motor and gearbox unit in such a manner that it quickly develops a force that compensates, at least in part, the internal forces within the unit likely to oppose the movement of the control member as desired by the user.

This compensation occurs even though the movable portions of the unit have still not yet been set into movement, such that the user feels the effects of friction internal to the actuator less, or not at all if the compensation is total, with the friction thus also being compensated in time. The compensation makes the force-feedback device more faithful and more agreeable to manipulate.

BRIEF DESCRIPTION OF THE FIGURES

The invention can be better understood in the light of the following description of the figures of the accompanying drawing, in which:

FIG. 1 is a diagrammatic representation of a cable force-feedback device in a particular embodiment of the invention; and FIG. 2 is a diagram showing the various steps of the movement of a force-feedback device managed in accordance with the invention.

DETAILED DESCRIPTION OF THE INVENTION

FIG. 1 shows a force-feedback device comprising a control member 1 (e.g. a lever, a handle, or indeed a segment of a master arm), coupled to a cable 2 that is actuated by a motor and gearbox unit 3 having a motor 4 that is adapted to move the movable portions of the unit that are coupled to the cable 2 in order to cause the cable to travel in one direction or the other. In this example, the cable 2 is mounted between two pulleys 5. The device includes two detectors 6 for detecting variation in sag in the cable 2, which detectors are arranged in the immediate proximity of the cable 2 where it leaves the adjacent pulley.

The operation of the device is explained below with reference to FIG. 2 that shows six steps (referenced A to F) of putting the device into movement. In this figure, the three elements of the actuation system are represented symbolically. There can be seen: the control member 1 represented in the form of a mass that is subjected to friction; the cable 2 represented diagrammatically in the form of a link extending between the control member 1; and the movable portions 10 of the unit 3 (in particular the rotor of the motor 4 and all of the elements driven by the motor), which are likewise represented in the form of a mass that is subjected to friction. In this example, the portion of the cable shown in FIG. 2 includes the portion that extends between the left-hand pulley and the lever 1 in FIG. 1. For the purposes of explanation, it is assumed that the control member 1 is pushed from left to right in FIG. 1, as represented by the arrow.

The speed state ($\dot{x}$) and the acceleration state ($\ddot{x}$) of each of the masses is written on the element in question.

Step A represents the device completely at rest. The user is not manipulating the control member 1, and the unit 3 is not activated. At rest, the portion of the cable that extends between each of the pulleys and the control lever presents a certain amount of sag y, resulting from the effects of gravity and from the bending imposed on the cable by the adjacent pulley.

In step B, the user begins to handle the control member 1 by applying a certain force Fu on the control member 1. Nevertheless, the force Fu remains below a static friction force threshold Rsu opposing the movement of the control member 1, such that it still does not move.

In step C, the force Fu applied by the user to the control member 1 exceeds the static friction force threshold Rsu, such that the control member becomes unstuck and begins to move. The opposing friction, written Ru, then diminishes to become equal to the dynamic friction, possibly plus any viscous friction to which the control member 1 is subjected.

In step D, the control member 1 is moving, while the movable portions 10 of the unit 3 are still not moving. In this example, the portion of the cable 2 shown is subjected to lengthening Δx that is equal to the movement of the control lever 1 and that causes a driving force Fm to be transmitted to the movable portions 10 of the unit 3, which driving force Fm is equal to the change in length of the cable ix multiplied by its stiffness K (Fm=K·Δx). Nevertheless, the driving force Fm is less than the internal static friction Rsa of the unit 3 opposing movement of the movable portions 10 thereof, such that the movable portions 10 remain stationary.

According to the invention, a variation Δy in the sag of the cable 2 relative to its sag at rest is detected, where this variation is caused by the variation in the length of the cable. The sag variation Δy (here a reduction compared with the sag at rest) is detected by the sag variation detector 6 that is adapted to deliver an electrical signal representative of the value and of the sign of the sag variation. This signal constitutes detecting an intention on the part of the user to make a movement.

In response to this detection, and as can be seen in step E, the motor 4 of the unit 3 is powered to exert very quickly a force Fa on the cable tending to compensate for the internal static friction Rsa of the unit. To do this, a force setpoint is generated that is equal to the internal static friction force Rsa of the unit 3, advantageously minus the above-mentioned driving force Fm. This force is easily estimated by measuring the variation in the length of the portion of cable in question. By way of example, this measurement may rely on signals from position sensors on the elements to which the portion of cable in question is coupled.

Thus, when the unit develops a force Fa equal to this force setpoint, it adds its own force to the driving force Fm in order to compensate for the internal static friction forces Rsa of the unit 3, so that the unit does not oppose any resistance to its movable portions being set into movement.

In step F, the movable portions 10 of the unit 10 are set into movement, such that the friction Rsa opposing movement of the movable portions of the actuator is now reduced to the dynamic friction, which dynamic friction is smaller than the static friction, possibly plus the viscous friction associated with the speed of movement of the movable portions of the actuator. This friction is now written Ra. Care is thus taken to ensure that the force requested of the unit compensates this friction force.

After the device has stopped, the control of the actuator once more observes the signal from the sag-variation detector 6 in order to detect the next start.

Naturally, if the user moves the control member 1 in the other direction, then the portion of cable shown in FIG. 2 will be subjected to shortening, and thus to an increase of sag. This variation in sag can be detected in the same manner (with its sign indicating the direction of the movement requested by the user). Alternatively, it is possible to use the signal from a second sag-variation sensor arranged to detect variations of sag in another portion of cable that becomes tensioned when the first portion of cable lengthens, and vice versa.

The sag variation detector(s) 6 may naturally be of any type (optical, magnetic, . . . ). In practice, all that matters is sensitivity, not accuracy. The sag-variation detector may be placed very freely along the strand of cable, even though the zone in the vicinity of the pulleys is preferable. It is appropriate to process the signal from the detector in order to filter noise from the signal as caused in particular when vibration of the device varies the sag of the cable, without the user manipulating the control member 1. In practice, it is advantageous to take account of the signal from the detector only above a threshold variation of sag.

Naturally, it is important for the unit to have a very short reaction time in response to detecting a variation in the sag of the cable, given the fast dynamics of the movement of the control member, in particular when it becomes unstuck. It is then important to have servo control that is stable, which generally requires a speed signal of high quality. Various solutions are known for obtaining such a signal: differentiating a signal from a high resolution position sensor, integrating a signal from an accelerometer.

The invention is not limited to the above description, but on the contrary covers any variant coming within the ambit defined by the claims.

What is claimed is:

1. A method of compensating friction in a force-feedback device comprising a control member manipulated by a user and coupled to a tensioned cable that is actuated by a motor and gearbox unit, which method comprises the steps of:
   initially moving the control member;
   detecting a variation in the sag of the cable caused by the initial movement of the control member at time prior to when movable portions of the motor and gearbox unit that are coupled to the cable have still not had the time to be set into movement the cable movement of movable portion of the motor and gearbox unit; and
   in response to detecting the variation, controlling the motor and gearbox unit so that the motor and gearbox unit develop a force that compensates, at least in part, the internal friction of the motor and gearbox unit that opposes movement of the control member manipulated by the user.

2. The method according to claim 1, wherein the variation in sag is detected by means of a detector placed in the immediate proximity of the cable.

3. The method according to claim 1, wherein, in response to detecting a variation in sag, a force setpoint is generated that is equal to the internal static friction of the motor and gearbox unit minus the drive force transmitted by the cable.

4. The method according to claim 1, wherein the control member is coupled to the tensioned cable without an intervening motor.

5. The method according to claim 1, wherein the control member is actuated by the motor and gearbox unit through the tensioned cable.

* * * * *